United States Patent
Kalmbach et al.

(10) Patent No.: US 8,968,138 B2
(45) Date of Patent: *Mar. 3, 2015

(54) DRIVE DEVICE FOR A MOTOR VEHICLE

(71) Applicant: Siemens Aktiengesellschaft, München (DE)

(72) Inventors: Klaus Kalmbach, Mössingen (DE); Klaus Schleicher, Nürnberg (DE); Janina Steinz, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,976

(22) Filed: Apr. 15, 2013

(65) Prior Publication Data

US 2013/0274052 A1  Oct. 17, 2013

(30) Foreign Application Priority Data

Apr. 16, 2012 (DE) .................. 10 2012 206 146

(51) Int. Cl.
*F16H 48/30* (2012.01)
*H02K 7/14* (2006.01)
*F16H 48/00* (2012.01)
*F16H 57/037* (2012.01)
*H02K 7/116* (2006.01)
*B60K 1/00* (2006.01)
*F16H 57/02* (2012.01)

(52) U.S. Cl.
CPC ............... *H02K 7/14* (2013.01); *F16H 48/00* (2013.01); *F16H 57/037* (2013.01); *H02K 7/116* (2013.01); *B60K 1/00* (2013.01); *F16H 2057/02034* (2013.01); *B60K 2001/001* (2013.01)
USPC .......................................................... 475/150

(58) Field of Classification Search
CPC .......... F16H 2057/02034; F16H 48/00; F16H 57/037; F16H 48/06; F16H 57/031; F16H 3/44; B60K 2001/001; B60K 17/046; B60K 17/165; B60K 6/48; B60K 1/02; H02K 7/14
USPC ................................................. 475/150, 149
See application file for complete search history.

(56) References Cited

U.S. PATENT DOCUMENTS

| | | | | |
|---|---|---|---|---|
| 4,467,230 A | * | 8/1984 | Rovinsky | 310/83 |
| 5,372,213 A | * | 12/1994 | Hasebe et al. | 180/65.6 |
| 5,396,968 A | * | 3/1995 | Hasebe et al. | 180/65.6 |
| 5,528,094 A | * | 6/1996 | Hasebe et al. | 310/112 |
| 5,637,048 A | * | 6/1997 | Maeda et al. | 475/150 |
| 5,759,128 A | * | 6/1998 | Mizutani et al. | 475/149 |
| 5,845,732 A | * | 12/1998 | Taniguchi et al. | 180/65.6 |

(Continued)

FOREIGN PATENT DOCUMENTS

| | | |
|---|---|---|
| DE | 3904516 C1 | 6/1990 |
| DE | 102005055690 A1 | 5/2007 |

*Primary Examiner* — Dirk Wright
(74) *Attorney, Agent, or Firm* — Henry M. Feiereisen LLC (57) ABSTRACT

A drive device for a vehicle includes at least one electric machine having at least one rotor element which is configured to delimit an installation area in a radial direction, and an active rotor part which is operably connected to the rotor element and has a ring structure to guide a magnetic flux of the electric machine. At least one transmission device is disposed, at least partly, in the installation area and configured to be driven by the electric machine via the rotor element.

9 Claims, 3 Drawing Sheets

(56) References Cited

U.S. PATENT DOCUMENTS

| | | | |
|---|---|---|---|
| 7,316,627 B2 * | 1/2008 | Bennett | 475/149 |
| 7,497,286 B2 * | 3/2009 | Keller et al. | 180/65.6 |
| 7,717,203 B2 * | 5/2010 | Yoshino et al. | 180/65.51 |
| 7,815,535 B2 * | 10/2010 | Ai et al. | 475/149 |
| 8,177,007 B2 * | 5/2012 | Abe et al. | 180/65.285 |
| 8,562,470 B2 * | 10/2013 | Yang | 475/9 |
| 8,633,622 B2 * | 1/2014 | Chamberlin et al. | 310/83 |
| 8,672,070 B2 * | 3/2014 | Palfai et al. | 180/65.6 |
| 2005/0034906 A1 * | 2/2005 | Liao | 180/65.6 |
| 2011/0224043 A1 * | 9/2011 | Bachmann et al. | 475/149 |
| 2012/0129644 A1 * | 5/2012 | Palfai et al. | 475/150 |
| 2013/0123057 A1 * | 5/2013 | Markl | 475/150 |
| 2013/0123058 A1 * | 5/2013 | Markl | 475/150 |
| 2013/0274050 A1 * | 10/2013 | Kalmbach et al. | 475/150 |
| 2013/0274051 A1 * | 10/2013 | Kalmbach et al. | 475/150 |
| 2013/0274053 A1 * | 10/2013 | Bauerlein et al. | 475/150 |

* cited by examiner

DRIVE DEVICE FOR A MOTOR VEHICLE

CROSS-REFERENCES TO RELATED APPLICATIONS

This application claims the priority of German Patent Application, Serial No. 10 2012 206 146.0, filed Apr. 16, 2012, pursuant to 35 U.S.C. 119(a)-(d), the content of which is incorporated herein by reference in its entirety as if fully set forth herein.

BACKGROUND OF THE INVENTION

The present invention relates to a drive device for a motor vehicle.

The following discussion of related art is provided to assist the reader in understanding the advantages of the invention, and is not to be construed as an admission that this related art is prior art to this invention.

Electric and hybrid vehicles which are able to be driven by at least one electric motor via a corresponding drive device of the motor vehicle are known from the prior art as well as from series production of motor vehicles, especially of automobiles. In such motor vehicles, wheels of the vehicle are driven by an electric motor via corresponding drive shafts.

A transaxle construction is known for electric motors, which is not to be confused in this context with the arrangement of one drive unit in a front area of the vehicle and an associated transmission on a rear drive axle of the vehicle. Transaxle construction here is especially to be understood as the electric motor, especially its rotor element, being installed between driven wheels transverse to the longitudinal direction of the vehicle. In this transaxle construction torques provided by an electric motor via its rotor element to drive the wheels are initially taken off at a first axial end of the electric motor on a first side and then, for example via a hollow shaft, fed to a second side spaced away from the first side in the transverse direction of the vehicle to a second axial end of the electric motor spaced away from the first axial end in the transverse direction of the vehicle. Two concentric shafts are provided for this type of arrangement, which demand a respective and thus duplicated outlay for example to present separate supports of the shafts. In addition, these drive devices require relatively large installation space in the axial direction of the electric motor.

It would therefore be desirable and advantageous to provide an improved drive device for a vehicle to obviate prior art shortcomings and to construct as to have small installation space requirement.

SUMMARY OF THE INVENTION

According to a first aspect of the present invention, a drive device for a vehicle includes at least one electric machine having at least one rotor element which is configured to delimit an installation area in a radial direction, and an active rotor part operably connected to the rotor element and having a ring structure to guide a magnetic flux of the electric machine, and at least one transmission device disposed, at least partly, in the installation area and configured to be driven by the electric machine via the rotor element.

In accordance with the present invention, torque provided by the electric machine in its motor mode can be taken off via the rotor element from the electric machine. At least one transmission device can be driven via the rotor element by the electric machine so that torque provided by the electric machine can be introduced into the transmission device via the rotor element. As a result of the arrangement of the transmission device at least partly in the rotor element, the transmission device is integrated into the rotor element, so that a drive device according to the invention requires little installation space, especially in the axial direction of the electric machine. In particular installation space losses, which would result from an arrangement of the transmission device in the axial direction next to the rotor element or next to the electric machine, can be avoided, since the transmission device does not adjoin the rotor element or the electric machine in the axial direction, but instead is accommodated in the rotor element. In other words, the transmission device is surrounded in the radial direction at least partly by the rotor element and is covered over by the rotor element.

According to another advantageous feature of the invention, the transmission device can be disposed completely in the installation area and thus is completely covered over by the rotor element in the radial direction. This further reduces the requirement for installation space The rotor element includes an active rotor part to guide the magnetic flux of the electric machine. An active rotor part is understood to be a rotor of an electric machine, i.e. of an electric motor or of a generator. The term "active rotor part" may for example also relate to a secondary part of a linear motor. What the active rotor parts have in common is that they can be manufactured for example by packaging metal sheets. The active rotor parts can however also be manufactured in other ways.

As a result of a configuration of the geometry of the active rotor part in the form of a thin-walled ring structure, the active rotor part is adapted in accordance with the pre-determinable and advantageous magnetic flux guidance, so that the active rotor part and thus the drive device require especially little installation space. In particular the radial extent of the active rotor part can be optimized in accordance with the pre-determinable magnetic flux guidance and be kept especially small, so that the drive device also has only a very small installation space requirement in the radial direction.

The active rotor part can be used in such cases independently of the functional principle of the electric machine. Therefore, the electric machine can be embodied for example as a synchronous machine, e.g. as a permanently-excited machine, or as an asynchronous machine.

A configuration of the active rotor part as being connected to the rotor element and having a ring structure to guide a magnetic flux of the electric machine also takes account especially of the magnetic function of the rotor element, especially depending on the integration of the transmission device into the rotor element. In other words, the rotor element is adapted by the configuration of the active rotor part to the conditions resulting from the integration of the transmission device into the rotor element and is optimized in respect of these conditions, so that the drive device has an advantageous functional capability and only a small installation space requirement.

According to another advantageous feature of the invention, the ring structure can be formed by at least one laminated core with a plurality of laminations of the active rotor part. This enables the active rotor part to be manufactured by core lamination for example, wherein the laminations are layered above one another. Thus, the active rotor part has an especially advantageous function while simultaneously realizing a very small space requirement.

According to another advantageous feature of the invention, the rotor element can include a rotor carrier on which the active rotor part is held. In such cases the installation area is for example delimited at least partly, especially completely, by the rotor carrier.

By the provision of both the active rotor part and also the rotor carrier, a separation of functions is created in which the active rotor part serves especially to guide the magnetic flux and can be embodied and accordingly optimized in respect of this function. The rotor carrier serves especially to hold the active rotor part and to delimit the installation area, so that the rotor carrier can also be adapted to these functions and can be optimized in respect of these functions. In other words, the functions of the rotor element are distributed between two components especially joined mechanically to one another, in the form of the rotor carrier and the active rotor part, accompanied with the afore-mentioned advantages.

According to another advantageous feature of the invention, the active rotor part and the rotor carrier can be linked to one another by a positive fit and/or a non-positive fit. As a result, the active rotor part is attached especially solidly to the rotor carrier, on one hand. On the other hand, the need for weight-intensive and space-intensive connection elements for connecting the active rotor part to the rotor carrier is avoided. This is to the benefit of the small space requirement of the drive device.

According to a second aspect of the present invention, a drive device for a motor vehicle includes at least one electric machine having at least one rotor element which includes an essentially sleeve-shaped rotor carrier to delimit, at least partly, an installation area in a radial direction, and at least one transmission device disposed, at least partly, in the installation area and configured to be driven by the electric machine via the rotor element.

In this way, the mechanical function of the rotor element and especially of the rotor carrier is taken into account, so that the rotor carrier can be best suited to the conditions and requirements resulting from the integration of the transmission device into the rotor element and can be optimized accordingly. The invention thus takes account of the magnetic function of the rotor element and especially of the active rotor part within the framework of the first aspect of the invention and takes account of the mechanical function of the rotor element and especially of the rotor carrier within the framework of the second aspect of the invention. In such cases advantageous embodiments of the first aspect of the invention are to be viewed as advantageous embodiments of the second aspect of the invention, and vice versa.

As a result of the preferably thin-walled tubular structure of the sleeve-shaped rotor carrier, the rotor carrier, especially in the radial direction, requires only very little installation space. In addition a relatively large amount of installation space is available inside the rotor carrier in order to dispose the transmission device there.

The preferably delicate rotor carrier is adapted and optimized in respect of its cross section to the transmission of the torques, so that even relatively high torques can be transmitted and/or to be converted in only a very small installation space. As a result, a drive device according to the invention has a very high specific power.

According to another advantageous feature of the invention, the rotor element can include an active rotor part held on the rotor carrier for guiding a magnetic flux of the electric machine, with the active rotor part and the rotor carrier being linked to each other by a positive fit or non-positive fit. As a result, the active rotor part and the rotor carrier can be connected in an especially firm and space-saving manner.

According to another advantageous feature of the invention, the rotor element and the transmission device can be disposed, at least partly, coaxially to one another. In other words, at least some of a plurality of rotatable transmission elements of the transmission device can be disposed coaxially to the rotor element. Thus, the drive device requires especially little installation space.

According to another advantageous feature of the invention, the transmission device may include a differential gear. This enables the vehicle to be driven especially advantageously by means of the drive device, since the differential gear makes different speeds of the wheels possible, when the vehicle is negotiating a curve for example, without this resulting in undesired stress on the drive device.

The differential gear in this case is disposed at least partly, especially completely, in the installation area. This is advantageous in so far as this arrangement of the transmission device and especially of the differential gear at least essentially in the axial center of the rotor element, means that there can be an especially advantageous course of a force and/or torque flow from the electric machine via the transmission device to the wheels of the motor vehicle. The flow of force and/or torque is hereby realized at least essentially for the axial center of the rotor element for example directly to the respective drive shafts of the wheels, without the flow of force and/or torque having to be initially routed to a first axial side and subsequently to an opposite, second axial side of the electric machine.

According to another advantageous feature of the invention, the transmission device can include at least one transmission stage configured to be driven by the electric machine, with the differential gear configured to be driven via the transmission stage and the rotor element by the electric machine. The differential stage is thus disposed in series with the transmission stage and downstream thereof. Thus, torque provided by the electric machine may, for example, be transmitted by the transmission stage before torque is introduced into the differential gear.

The transmission device can be embodied as a single-stage device with just one transmission stage. Advantageously, the transmission device is embodied as a multi-stage unit with at least two transmission stages, which are suitably connected in series with one another. Preferably, all transmission stages of the transmission device are disposed at least partly, especially completely, in the installation area and especially at least essentially in the axial center of the rotor element. As a result of this arrangement of the transmission stages and, optionally, of the differential gear axially in the rotor element, the drive device requires very little installation space.

According to another advantageous feature of the invention, the transmission device can include a plurality of transmission stages which are connected in series with one another to thereby define a first transmission stage and a last transmission stage, with the differential gear being configured to be driven via the last transmission stage. This results in especially advantageous function and little installation space requirement of the drive device. In this case, the transmission stages and the differential gear are connected to one another in series in accordance with the flow of force and/or torque.

According to another advantageous feature of the invention, the at least one transmission stage of the transmission device can be embodied as a planetary gear. Such a planetary gear has a very high specific power and can also provide very high transmission ratios in only a very small installation space. Of course, the at least one transmission stage may also be of different configuration. The planetary gear may have a sun wheel which can advantageously be linked to the rotor carrier. Thus, the sun wheel is driven by the rotor carrier and functions as an introduction element of the planetary gear.

Torque supplied by the electric machine is therefore introduced into the planetary gear via the sun wheel.

In one variant, the planetary gear may include at least one hollow wheel which is stationary. The hollow wheel does therefore not rotate around an axis of rotation around which the sun wheel rotates during operation of the drive device. However a rotating hollow wheel might be equally conceivable. In addition it would also be conceivable to support the rotor carrier directly on the hollow wheel outer diameter, for example via a friction bearing, as with turbochargers, or via needle bearings.

To realize a small installation space requirement as well as a small number of parts, there is provision in such cases for the stationary hollow wheel of the planetary gear to be integrated into a housing element of the drive device, especially of the transmission device. In other words, the hollow wheel and the housing element are embodied in one piece with one another.

Advantageously, the planetary gear can include a planetary carrier on which at least one planetary wheel element of the planetary gear is supported. In this case the planetary carrier of the planetary gear is linked to the differential gear. Thus, the planetary carrier serves as a take-off element of the planetary gear, via which torque is taken off and transmitted to the differential gear. This enables especially advantageous transmission ratios to be presented.

The differential gear may be configured as a bevel differential gear. In this way, torque can be transmitted in an efficient and space-saving manner to the drive shafts able to be coupled or coupled to the differential gear. Other configurations are, of course, conceivable as well.

Because of the integration of the transmission device and especially of the differential gear into the rotor element, it is advantageously possible to route the drive shafts directly, i.e. without diversions, to the respective side of the electric machine. Thus, no further gearing is provided in the flow of force and/or torque from the differential gear to the wheels and the flow of force and/or torque runs without transmission stages. This is to the benefit of the low installation space requirement. Furthermore the integration of the transmission device into the rotor element already makes it possible to present advantageous transmission ratios.

When the transmission device is embodied as a multi-stage device and has at least two transmission stages, one of the transmission stages may be configured as a first planetary gear and the other transmission stage can be configured as a second planetary gear. The second planetary gear may hereby be driven by the first planetary gear.

When present, the differential gear can be connected in series to the planetary gears connected to one another in series and is driven via the second planetary gear.

Advantageously, a first sun wheel of the first planetary gear is linked permanently to the rotor carrier of the rotor element, so that torque can initially be introduced via the rotor carrier and the first sun wheel into the first planetary gear.

To provide an especially advantageous connection of the planetary gears there is for example also provision for the first planetary gear to have a first planetary carrier, on which at least one first planetary wheel element of the first planetary gear is supported, wherein the first planetary carrier is coupled to a second sun wheel of the second planetary gear. Thus, torque is taken off from the first planetary gear via the first planetary carrier and transmitted to the second sun wheel, via which the torques will be introduced into the second planetary gear.

When the transmission device has at least one further transmission stage embodied as a further planetary gear, the described connection to the first and to the second planetary gears is repeated in accordance with the number of transmission stages. Advantageously, the second or the last planetary carrier of the second or last planetary gear can then be linked to the differential gear.

The second planetary gear can also include at least one second hollow wheel which is stationary or fixed and which does not rotate around an axis of rotation about which the planetary gears or the sun wheels and the planetary carriers rotate. Advantageously, the second hollow wheel is integrated into a housing element of the drive device especially of the transmission device, which results in a lower weight and also a smaller number of parts. Suitably, all hollow wheels of all planetary gears are thus integrated into the housing element or into a respective housing element of the drive device, especially of the transmission device.

To realize an advantageous, effective and efficient cooling and/or lubrication of the drive device, a fluid supply device having at least one fluid channel may be additionally provided. At least one cooling and/or lubrication point of the drive device is able to be supplied with fluid for lubrication and/or cooling of the cooling and/or lubrication point via the fluid channel. The fluid channel runs hereby in at least one part area in a stationary first component of the drive device and in at least one second part area, adjoining the first part area in the direction of flow of the fluid to the cooling and/or lubrication point through the fluid channel, runs in a second component of the drive device able to be rotated around an axis of rotation relative to the first component. Thus, fluid first enters the stationary, non-rotating first component. Subsequently the fluid is supplied via the fluid channel to the rotatable or rotating second component. This makes it possible in an effective and efficient way to cool at least one component of the drive device via the cooling and/or lubrication point so that a desired functionality of the drive device can be ensured even over a long service life.

Cooling and/or lubrication especially enables losses caused by toothed wheels of the transmission device rolling off one another and/or losses caused by bearing friction of the drive device to be kept small.

The fluid can be used for transporting away dissipated heat so that especially components of the drive device assigned to the transmission device and disposed at least partly in the installation area can be cooled especially by convective cooling. Thus the operating temperature of the drive device can be kept within a small framework.

Advantageously, the second component is a shaft able to be rotated around the axis of rotation. This enables fluid to be conveyed over a relatively long distance. Furthermore this allows advantageous distribution of the fluid to a plurality of cooling and/or lubrication points of the drive device which might be present.

In a further advantageous embodiment of the invention, in a first channel area, the fluid channel runs in the shaft in an axial direction and, in a second channel area adjoining the first channel area, in a radial direction of the shaft. Lubricant can thus flow from the first channel area into the second channel area. The radial course of the second channel area in this case is advantageous to the extent that the fluid is conveyed by centrifugal force as a result of the rotation of the shaft through the second cooling area to the cooling and/or lubrication point. This enables the effort for conveying the fluid to be kept especially low.

The shaft can, for example, be embodied as a hollow shaft to permit formation of the channel areas in the shaft. The channel areas are formed for example by holes drilled in the shaft, especially the hollow shaft.

Advantageously, the second channel area opens out onto the cooling and/or lubrication point. This enables the fluid conveyed by centrifugal force through the second channel area to emerge at least essentially directly at the cooling and/or lubrication point and to cool and/or especially lubricate the corresponding components of the drive device. This makes it possible for example to lubricate and to cool at least one toothed wheel to be lubricated and cooled and/or to lubricate and to cool at least one bearing, especially a roller bearing, to be cooled and lubricated. Sealing elements such as radial shaft seals for example can also be lubricated by means of this system, in order to avoid a premature failure or to minimize friction losses.

The centrifugal force resulting from the rotation of the second component, especially of the shaft, transports the fluid to walling of the drive device, especially of the transmission device. The fluid cools down on the walls and collects especially through gravity at the at least one lowest point in the housing in the height direction.

In a further advantageous embodiment of the invention, the first component is a housing part of the drive device. The housing part is for example a housing part of the transmission device and thus a transmission housing. Through this an especially simple and simultaneously efficient and effective guidance of the fluid is realized. The housing part may be disposed at least partly in the installation area. This leads to an especially small space requirement for a drive device according to the invention. The housing part is suitably cooled by fluid. In other words, fluid is used to transport dissipated heat away from the housing part, so that the operating temperature of the drive device and especially of the transmission device can be kept low.

When the housing part is assigned to the transmission device, heat can be dissipated via the fluid to a surface of the housing for convective cooling to the surroundings of the housing part.

A drive device according to the invention permits both to cool and lubricate components of the drive device by fluid. Cooling is realized for example as a result of fluid flowing through the fluid channel. As an alternative or in addition, cooling occurs as a result of fluid being taken out of a fluid reservoir in which the fluid collects upstream from the cooling and lubrication point via at least one outlet channel and flowing through the outlet channel. Heat is transported away in each case in this throughflow process. The corresponding components are lubricated for example by the fluid emerging from the fluid channel through which fluid is applied to the component to be lubricated.

Advantageously, at least one air gap is provided in a radial direction between the housing part disposed at least partly in the installation area and the rotor element, via which the rotor element is to be cooled by the fluid-cooled housing part. Thus the operating temperature of the rotor element can also be kept low, which is beneficial to the function and performance of the drive device.

The electric machine may also be operated in a generator mode, so that for example mechanical energy introduced into the electric machine via driven wheels of the motor vehicle, the transmission device and the rotor can be converted at least partly into electrical energy. This enables recovery of braking energy.

Advantageously, at least one heat exchanger can be disposed upstream of the first part area for cooling fluid. Fluid is thus initially cooled by the heat exchanger before being supplied to the fluid channel running in the first component. Especially low temperatures of the fluid can be realized by the heat exchanger, so that the corresponding components to be lubricated and/or to be cooled can be cooled and/or lubricated especially effectively and efficiently. The heat exchanger may be disposed outside the transmission device and the rotor element and especially outside the installation area, so that an advantageous heat transfer from the hot fluid via the heat exchanger to the surroundings of the heat exchanger can take place.

At least one pump device may also be provided to convey fluid, collected in the fluid reservoir, out of the fluid reservoir. This enables fluid to be conveyed out of the fluid reservoir even at relatively high lateral accelerations, so that lubrication and/or cooling of the drive device is ensured even in the presence of such lateral forces. The pump device is configured to pump fluid, collected and heated up in the fluid reservoir, out of the fluid reservoir, also referred to as the oil sump, and to supply it to the external heat exchanger for cooling the fluid. Subsequently the cooled fluid is supplied to the fluid channel running in the first component, through which the fluid circuit is closed.

At least two cooling and/or lubrication points may be provided, with each of the cooling and/or lubrication points being assigned to at least one channel area. The cooling and/or lubrication points can be supplied with fluid via the channel areas of the fluid channel, so that corresponding components can be cooled and/or lubricated via the respective cooling and/or lubrication points. The channel areas may have differently sized flow cross-sections through which fluid can respectively flow. The flow cross-sections of the channel areas can thus be suited to the corresponding components, which are also referred to as consumers, so that the flow of fluid through the fluid circuit can be optimized. The cooling and/or lubrication point can also be referred in general as point of consumption.

To realize an especially advantageous conveyance of the fluid and also to supply the cooling and/or lubrication point with the correct amount of fluid required, a pump device can be provided for conveying the fluid and configured to set a pressure of the fluid. In particular pressure regulation is able to be carried out by the pump device, so that the fluid pressure can be suited for example to different driving situations. The pump device may be the same as the pump device for conveying fluid out of the fluid reservoir.

Suitably, a cooling device with at least one cooling channel for cooling a stator of the electric machine can be provided. Fluid for cooling the stator flows hereby through the cooling channel. In other words, the fluid serves both to cool and/or lubricate the cooling and/or lubrication point and also to cool the stator. Advantageously, cooling and/or lubrication of the transmission device can be combined with cooling of the stator, with cooling and/or lubrication of the transmission device and cooling of the stator being realized by fluid in a serial or parallel arrangement of the respective fluid circuit. Cooling and/or lubricating the drive device is thus simplified so that the drive device requires only little space. Using the centrifugal force, the effort involved in conveying the fluid can also be kept small. Through alternative or additional use of the pump device and the possible setting of fluid the pressure enables lubrication and/or cooling under pressure so that the corresponding components of the drive device can especially be supplied with the corresponding amount of fluid required.

A drive device according to the invention enables a central cooling of all components of the drive device to be cooled and especially of the transmission device as well as a central lubrication of all components to be lubricated and especially rotating components of the drive device, especially of the transmission device. Using fluid to cool the electric machine enables expansion of the functionality in a space-saving and cost-effective manner while simultaneously realizing a very compact design of the drive device.

A drive device according to the invention may be configured to have at least two components which are rigidly linked to one another in such a way that a detachment from one another is not possible without destroying them. As a result, connectors such as for example screws or the like for reversible releasable connection of the components as well as the corresponding attachment areas for these connectors can be dispensed with and saved, so that a drive device according to the invention requires especially little installation space.

Reversibly-releasable connections, which for example may involve flanged connections between the components, generally require much installation space and increase weight. By eliminating these types of connections in the drive device, weight can be saved. As there are no flange connections, the radial installation space of a drive device according to the invention can also be kept especially small. The need for little radial installation space also makes it possible to present especially high efficiencies of the transmission device and the electric machine, so that the motor vehicle can be driven in an energy-efficient manner and can cover a long range.

A drive device can be manufactured at low costs, since the components, as a result of their not being linked to one another in a non-destructively releasable manner, can be manufactured as delicate components and thus with only a small outlay in materials. In addition the connection between the components not able to be released non-destructively is highly failsafe in view of the absence of any connections that could become loose during operation of the transmission device. The delicate and thus light configuration of the components also makes it possible for example—if the components are rotating components during the operation of the drive device—to realize especially low moments of inertia of the drive device.

Advantageously, the components can be linked to one another by a material bond. This makes possible an especially solid and also space-saving and low-cost connection of the components. The components may hereby be glued to one another. The components may also be welded to one another and thus linked especially solidly to one another. Very high torques can be transmitted between the components for example. Advantageously, welding may be executed by electron beam welding and/or by laser welding. Through the electron beam welding and laser welding the components can be welded solidly to one another and thus at low cost. Electron beam welding in particular, which is also referred to as EB welding, is especially advantageous, since electron beam welding is very effective and can be performed efficiently.

Of course, another, especially non-releasable connection technology can be used for the components rigidly linked to one another.

Advantageously, a first one of the components solidly linked to one another can be a housing element of a transmission housing of the transmission device. This enables the other component or other types of components of the drive device to be attached in a low-cost and space-saving manner to the especially stationary transmission housing element. A second one of the components may be a second housing element of the transmission housing of the transmission device. The transmission housing can thus be embodied in at least two parts, i.e. first and second housing elements which are linked to one another in a space-saving manner.

The transmission device may include at least one planetary gear having a planetary carrier, on which at least one planetary wheel element of the planetary gear is supported. The planetary carrier includes hereby a first planetary carrier part as a first one of the rigidly linked components and a second planetary carrier part as the second one of the rigidly linked components. The planetary carrier can thus be embodied in at least two parts with the two planetary carrier parts, which are linked to one another, especially welded to one another, in a space-saving and low-cost manner.

To realize an advantageous installation of the planetary carrier and especially a simple equipping of the planetary carrier with the planetary wheel elements, the planetary carrier parts may be disposed next to one another in an axial direction. Thus, the planetary carrier can be embodied axially divided.

Manufacture of a drive device according to the invention may involve, for example, initially a mounting of the planetary wheel element on one of the planetary carrier parts, after which the one of the planetary carrier parts is linked, especially welded, to the other planetary carrier part so that it cannot be released non-destructively. Advantageously, all planetary wheel elements of the planetary gear are first mounted on the one planetary carrier part, after which the planetary carrier parts are linked to one another in a manner that is not non-destructive.

The transmission device may include a differential gear having a differential case on which balance wheels of the differential gear are supported and which has a first case part as a first of the rigidly linked components and a second case part as the second of the rigidly linked components. The differential gear makes it possible for the motor vehicle to be driven very advantageously by the drive device, since, by means of the differential gear, different speeds of wheels of the motor vehicle driven via the differential gear, for example when the motor vehicle is negotiating a curve, are made possible, without this resulting in stress on the drive device.

The at least two-part construction of the differential gear or of its differential case enables the balance wheels and/or so-called shaft wheels to be initially mounted or supported in a time-saving and low-cost manner, after which the case parts are linked, especially welded, to one another without the use of a non-destructive connection. The shaft wheels can be coupled to drive shafts, wherein the wheels of the motor vehicle are driven via the drive shafts. To realize an especially simple installation of the differential gear, the case parts are disposed next to one another in an axial direction. As a result, the case parts are axially divided in an advantageous embodiment. All balance wheels and/or all shaft wheels of the differential gear may, for example, be mounted on the one case part, after which the one case part is linked in a manner which is not non-destructive to the other case part and thus in an especially space-saving manner.

Advantageously, a first one of the components solidly linked to one another is a first toothed wheel of the transmission device and the second component is a second toothed wheel of the transmission device. This provides an especially advantageous torque transmission between the toothed wheels possible. The toothed wheels may be disposed in coaxial spaced-apart relationship to one another in the axial direction, so that the connection of the toothed wheels not able to be released non-destructively enables a transmission of torque between the toothed wheels although these do not engage with one another via respective teeth. The first toothed wheel may be disposed in a first transmission stage and the second toothed wheel in a second transmission stage of the transmission device. This makes it possible to transmit especially high torques in a space-saving and efficient manner between the individual transmission stages without the transmission stages engaging with one another via respective teeth and being coupled to one another in this way.

Advantageously, all toothed wheels which are respective components of the transmission device and which are solidly linked to one another, are linked to one another using a connection which is not able to be released non-destructively. This presents an efficient and space-saving transmission even of very high torques between the toothed wheels, which leads to a high efficiency of the transmission device and thereby of the drive device.

One of the components that are solidly linked to one another may be configured as a sun wheel of a planetary gear. Thus, torque can be transmitted very efficiently and advantageously to the sun wheel. The sun wheel functions for example as an input element of the corresponding planetary gear. In other words, torque of the electric machine provided by the sun wheel is introduced into the corresponding planetary gear. Advantageously, the sun wheel is a first one of the rigidly linked components, wherein at least one of the housing elements is the second one of the rigidly linked components. As a result, torque supplied by the electric machine can be transmitted via the rotor element and the at least one housing element to the sun wheel and be introduced into the corresponding planetary gear.

As an alternative it is possible for the sun wheel to be a first of the rigidly linked components, wherein a planetary carrier of a further planetary gear of the transmission device which is connected upstream from the first planetary gear with the sun wheel is the second of the rigidly linked components. The planetary carrier can in this case be the planetary carrier previously described. Through this connection not able to be released non-destructively of the planetary carrier of the further planetary gear with the sun wheel of the first planetary gear connected downstream from the further planetary gear, the two planetary gears are linked to one another in a space-saving and efficient manner, so that even especially high torques can be transmitted between them.

It is also possible that one of the rigidly linked components is a planetary carrier of a planetary gear of the transmission device. The planetary carrier in this case can be the planetary carrier previously described. The planetary carrier is preferably used as an output element of the assigned planetary gear. In other words torques introduced into the gear element assigned to the planetary carrier are taken off via the planetary carrier from the assigned planetary gear or derived from this gear.

One of the components may also be a differential case of a differential gear of the transmission device. The differential gear in this case can be the differential gear previously described. This configuration enables torque to be introduced especially efficiently and also in a space-saving and low-cost manner into the differential transmission and also taken off from this transmission. In this case there is provision for example for the differential gear to be coupled to a planetary carrier of an associated planetary gear. The planetary carrier can in this case be the planetary carrier previously described. In particular this planetary carrier is an output element of the associated planetary gear, which in relation to the flow of force and/or torque from the rotor element to the differential gear, is the last of a number of gear stages of the transmission device.

Advantageously, all wheel sets of the transmission device may be connected to one another in the direction of a flow of force and/or torque in a manner which is not non-destructive. This makes a space-saving transmission of even very high torques between the wheel sets possible.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. The features and combinations of features specified in the description as well as the features and combinations of features specified in the description of the figures and/or in the figures alone are able to be used not only in the respectively specified combination, but also in other combinations or on their own, without departing from the framework of the invention.

Figure 1:
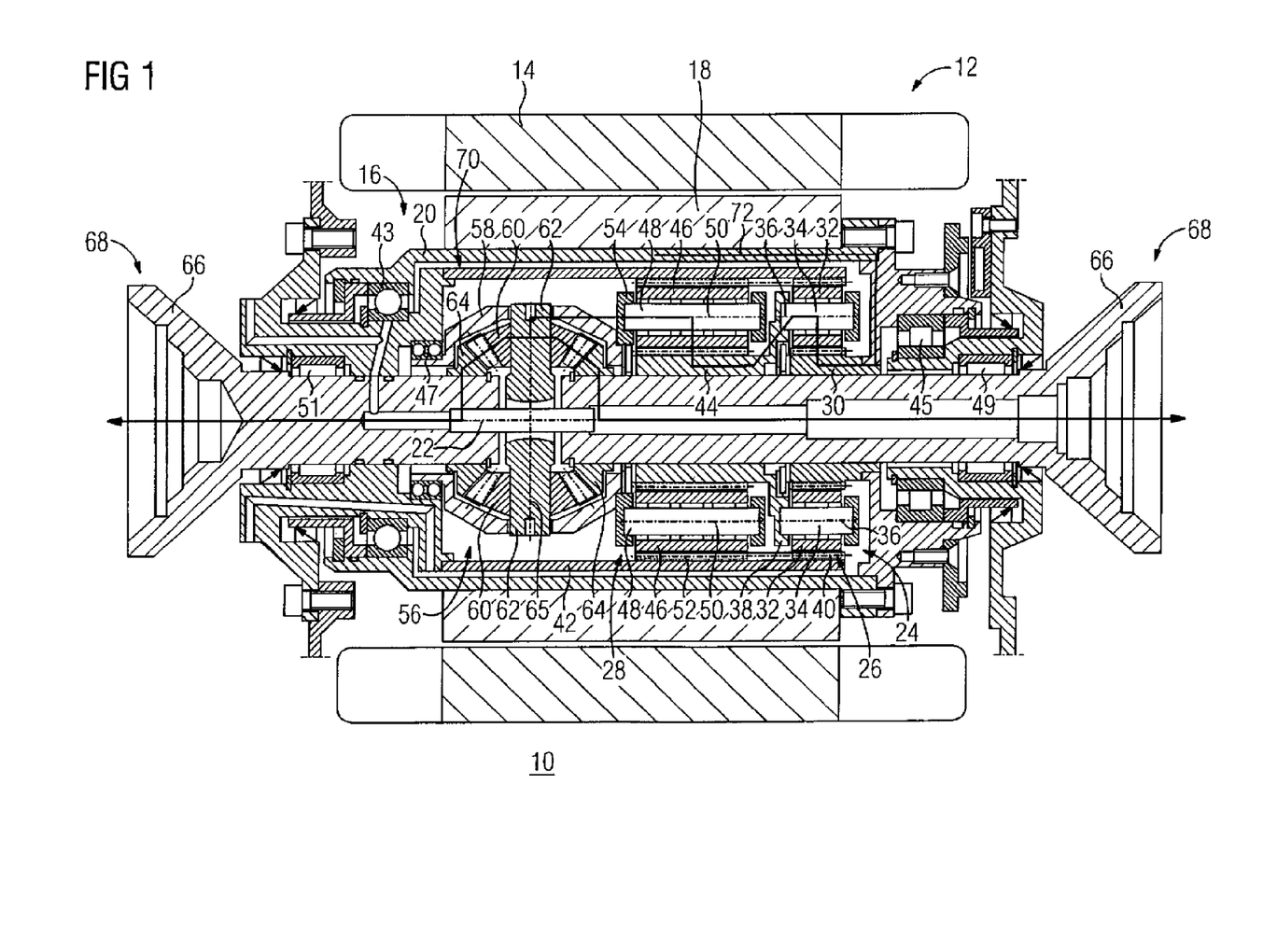
FIG. 1 is a schematic longitudinal section of a drive device for a motor vehicle.

Turning now to the drawing, and in particular to FIG. 1, there is shown a schematic longitudinal section of a drive device, generally designated by reference numeral 10 for a motor vehicle, which is embodied for example as an automobile. The motor vehicle can also be embodied as a hybrid vehicle or as an electric vehicle, especially with a range extender.

The drive device 10 includes an electric machine 12 having a stator 14, shown schematically only, and a rotor element 16, also shown schematically. The rotor element 16 has an active rotor part 18 with a magnetic circuit comprised of coils and/or magnets as well as a rotor carrier 20, to which the active rotor part 18 is attached. The rotor element 16 is rotatable about an axis of rotation 22.

The drive device 10 additionally includes a transmission device 24, which has, as its first transmission stage, a first planetary gear 26 and, as its second transmission stage, a second planetary gear 28. The first planetary gear 26 has a first sun wheel 30, which is rotatable about the axis of rotation 22 and coupled with the rotor carrier 20. As a result, torque provided by the electric machine 12, when operating in a motor mode via the rotor carrier 20 for example, is introduced into the first sun wheel 30, so that the first sun wheel 30 is driven by the rotor carrier 20. The first planetary gear 26 has a plurality of first planetary wheel elements 32 in mesh with the first sun wheel 30 via respective teeth. The first planetary gear elements 32 are supported on respective first planetary wheel studs 34 rotatable around an axis of rotation 36 and also via the first planetary wheel studs 34 on a first planetary gear carrier 38 of the first planetary gear 26. The first planetary wheel elements 32 can also rotate about the axis of rotation 22.

Furthermore the first planetary gear 26 comprises a first fixed hollow wheel 40, which is integrated into a transmission housing 42 of the transmission device 24. Thus, the transmission housing 42 and the first hollow wheel 40 are embodied in one piece with one another, wherein the first hollow wheel 40 does not rotate around the axis of rotation 22 during operation of the drive device 10. The first planetary wheel elements 32 are hereby in mesh via teeth with the first hollow wheel 40.

The second planetary gear 28 has a second sun wheel 44, which is rotatable about the axis of rotation 22 and coupled or linked to the first planetary carrier 38. As a result, the second sun wheel 44 is driven via the first planetary carrier 38 when the drive device 10 is operated. The second planetary gear 28 also includes a plurality of second planetary wheel elements 46 in mesh via teeth with the second sun wheel 44. The second planetary wheel elements 46 are supported on respective second planetary wheel studs 48 for rotation about respective axes of rotation 50 and can also rotate around the axis of rotation 22.

The second planetary gear 28 has a stationary second hollow wheel 52 in mesh via teeth with the second planetary wheel element 46 and likewise integrated into the transmission housing 42. The second planetary wheel elements 46 are supported or braced by their second planetary wheel studs 48 on a second planetary carrier 54.

The transmission device 24 additionally includes a differential gear 56 with a so-called differential case 58. The differential gear 56 also has a plurality of balance wheels 60, which are supported rotatably via respective balance studs 62 on the differential case 58 around an axis of rotation 65. Furthermore the differential gear 56 comprises shaft wheels 64, which are linked via teeth to drive shafts 66 in a torque-proof manner. The drive shafts 66 have respective connections 68, via which driven wheels of the motor vehicle can be linked in a torque-proof manner to the drive shafts 66.

As can be seen from FIG. 1, the differential gear 56 is embodied as a bevel differential gear, wherein the balance wheels 60 and the shaft wheels 64 are embodied as bevel gears and engage with each other via teeth in each case. The differential gear 56 comprises four balance wheels 60 for example.

As can be seen from the drawings, the transmission housing 42 on one of its sides, as considered in an axial direction, is radially supported exclusively on the transmission stages 26 and 28.

As can also be seen from FIG. 1, the transmission device 24 is not flanged into the rotor element 16 in axial arrangement, but by contrast is integrated into the rotor element 16.

The rotor element 16 delimits an installation area 70 in the radial direction, in which the two-stage transmission device 24 is housed with the differential gear 56. The differential gear 56 and/or the first planetary gear 26 may hereby project in the axial direction beyond the active rotor part 18; however neither the differential gear 56 nor the first planetary gear 26 projects beyond the rotor carrier 20 in the axial direction, so that the planetary gear 26, 28 and the differential gear 56 are completely accommodated in the installation area 70 and are surrounded and covered in the radial direction by the rotor element 16, especially the rotor carrier 20.

This projection beyond the active rotor part 18 by the differential gear 56 and/or the first planetary gear 26 in the axial direction can however be avoided with a different ratio of rotor length/diameter/speed/torque.

This avoids loss of installation space in the axial direction, since neither the differential gear 56 nor the planetary gear 26, 28 are flanged axially onto the rotor element 16. In addition—as indicated in FIG. 1 by a bold line 72—there is an at least essentially ideal and direct distribution of the torque provided by the electric machine 12 in its motor mode via its rotor element 16 at least essentially from the axial center of the rotor element 16 to the two drive shafts 66.

The bold line 72 characterizes in this case a flow of force and torque from the electric machine 12 in its motor mode via its rotor element 16 and especially its rotor carrier 20 via the planetary gears 26, 28 and the differential gear 56 to the drive shafts 66. The rotor element 16, the planetary gear 26, 28 and the differential gear 56 are hereby connected in series with one another in relation to the force and/or torque flow (bold line 72).

The first sun wheel 30 functions as first input element of the planetary gear 26, since the torque is introduced into the first planetary gear 26 via the first sun wheel 30. The first planetary carrier 38 functions as first output element of the first planetary gear 26, since the torque is derived from the first planetary gear 26 via the first planetary carrier 38.

The second sun wheel 44 linked to the first planetary carrier 38 functions as a second input element of the second planetary gear 28, while the second planetary carrier 54 of the second planetary gear 28 serves as a second output element of the second planetary gear 28 and is linked to the differential gear 56, especially to its differential case 58. In other words, the differential case 58 of the differential gear 56 is driven via the second planetary carrier 54, so that the balance wheels 60, and via these the shaft wheels 64, are rotated around the axis of rotation 22 via the differential case 58. Thus the drive shafts 66 are driven to also rotate about the axis of rotation 22.

Roller bearings 43, 45 are provided to support the rotor element 16. In addition a further roller bearing 47 is provided for supporting the differential case 58. The drive shafts 66 are supported by roller bearings 49, 51.

Through the integration of the planetary gears 26, 28 and the differential gear 56 into the rotor element 16 as well as the corresponding configuration of the gear stages as the planetary gears 26, 28, the drive device 10 requires especially little space and makes possible the efficient and effective transmission and conversion of the torque provided by the electric machine 12 through to the drive shafts 66.

Figure 2:
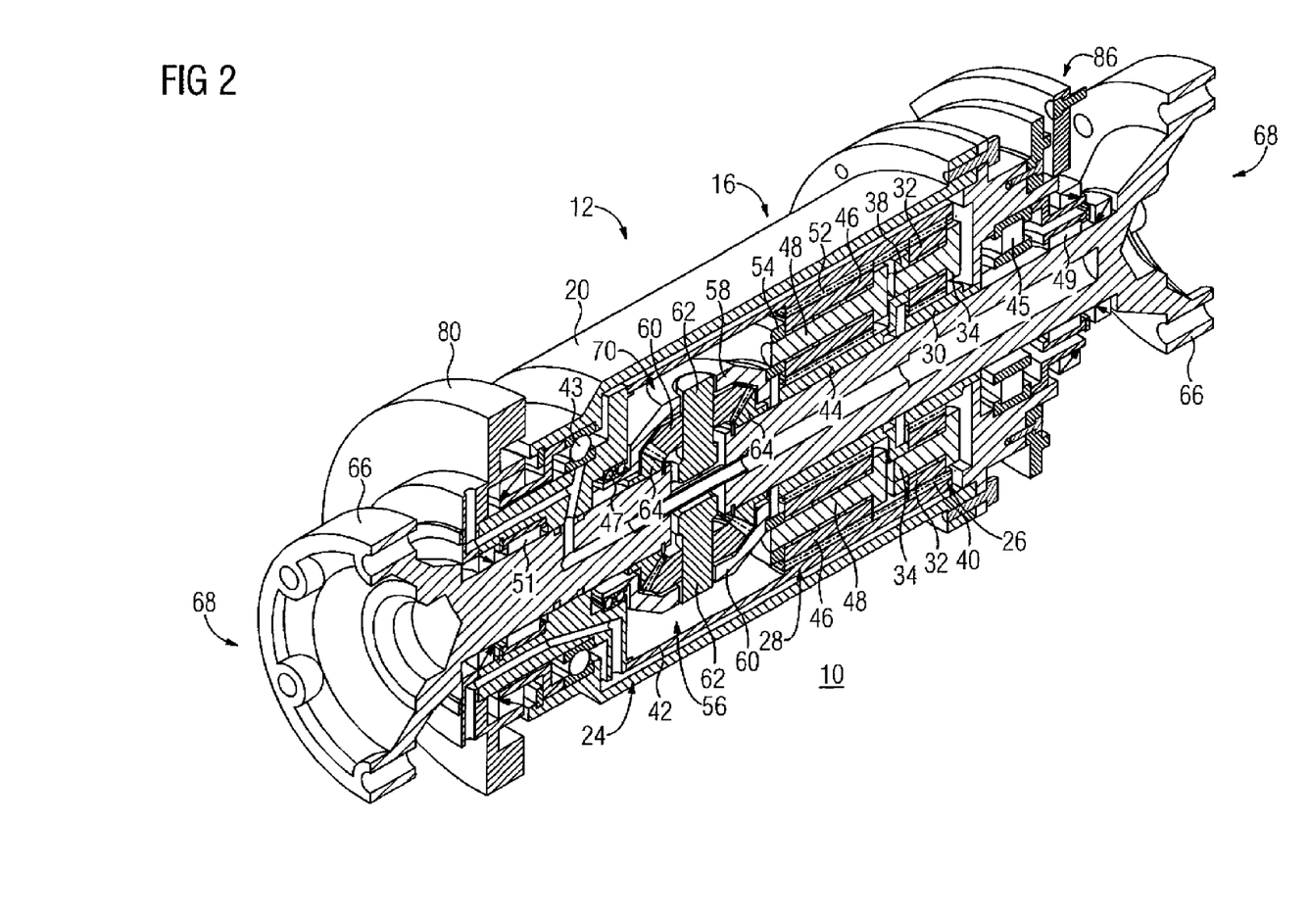
FIG. 2 is a schematic and perspective sectional view of the drive device in accordance with FIG. 1.
Figure 3:
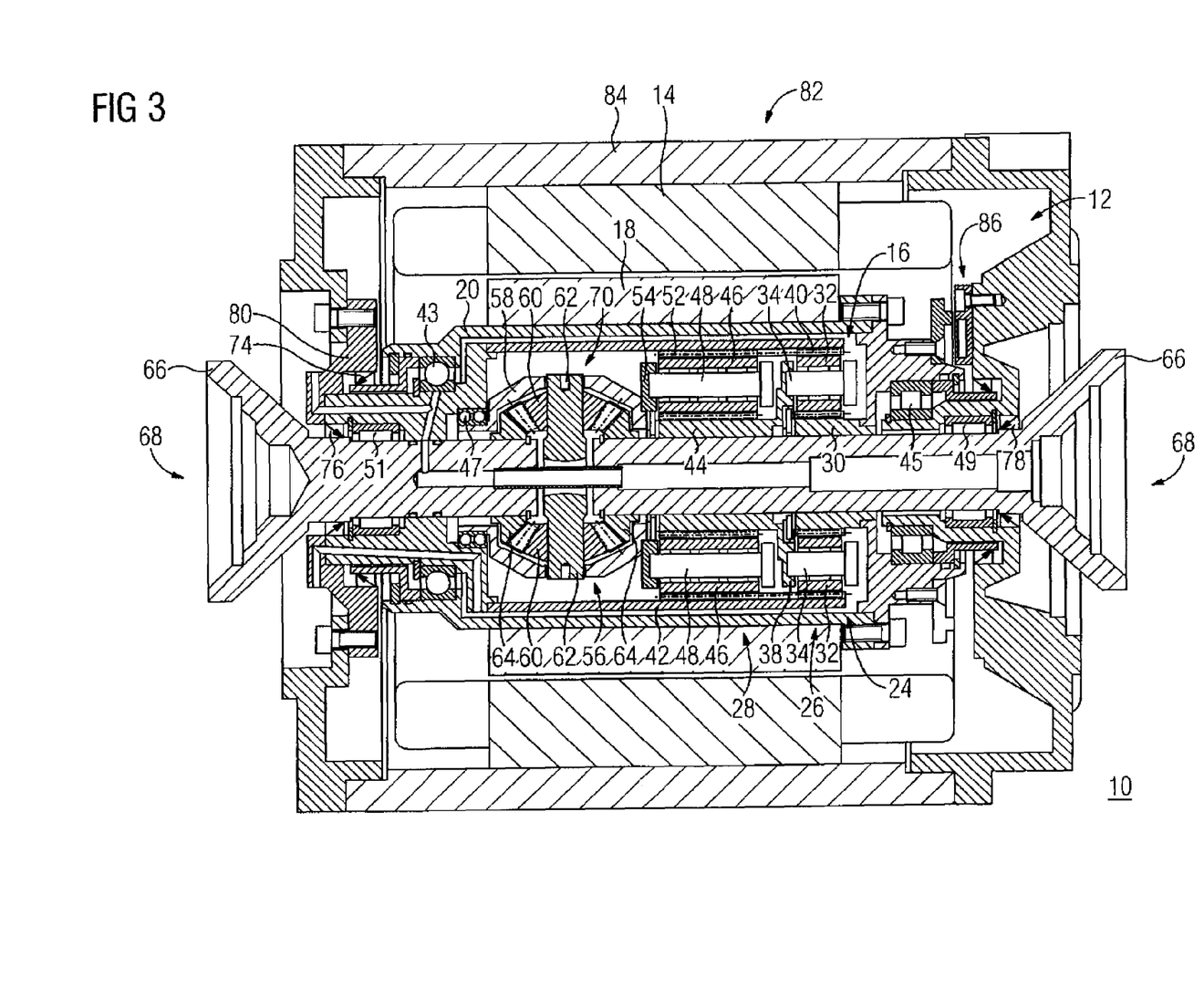
FIG. 3 is a further schematic longitudinal section of the drive device according to FIG. 1.

As can especially be seen in conjunction with FIGS. 2 and 3, the active rotor part 18 has a thin ring structure for guiding the magnetic flux of the electric machine 12. In this case the active rotor part 18 can be manufactured as a laminated core and especially by stacking metal sheets, especially electric steel. As an alternative, materials such as soft-magnetic materials, which can for example be injected like plastic, or air core inductors without iron would be other conceivable options for this purpose.

As can also be seen from FIGS. 1 to 3, the rotor carrier 20 is essentially sleeve-shaped, i.e. embodied as a thin-walled tube and in one piece, so that the need for space-intensive and weight-intensive connection areas and connection elements for connection of a number of rotor carrier parts to one another is eliminated. This is to the benefit of the small installation space requirement of the drive device 10.

Sealing elements 74, 76, 78 can also be seen in FIGS. 2 and 3. The rotor carrier 20 is sealed against a housing element 80 of a housing 82 of the drive device 10 by the first sealing element 74.

The housing 82 includes a second housing element 84 linked to the housing element 80, to which the stator 14 of the electric machine 12 is fixed. The transmission housing 42 is fixed to the second housing element 84 via the first housing element 80 so that it is stationary and does not rotate about the axis of rotation 22.

The left-hand drive shaft 66 in relation to the respective image plane of FIGS. 1 to 3 is sealed by the second sealing element 76 against the stationary transmission housing 42. The third sealing element 78 serves to seal the right-hand drive shaft 66 against the housing 82. A resolver 86 of the electric machine 12 can also be seen in FIG. 3.

FIG. 3 in particular shows the compact structure and the small installation space requirement of the drive device 10, both in the axial and also in the radial direction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A drive device for a motor vehicle, comprising:
   at least one electric machine having at least one rotor element which includes an essentially sleeve-shaped rotor carrier to delimit, at least partly, an installation area in a radial direction; and
   at least one transmission device disposed in a transmission housing and, at least partly, in the installation area and configured to be driven by the electric machine via the rotor element,
   wherein the transmission device comprises a plurality of transmission stages disposed at least partly in the installation area, and
   wherein the transmission housing on one of its sides, as considered in an axial direction, is radially supported exclusively on the transmission stages.

2. The drive device of claim 1, wherein the rotor element comprises:
   an active rotor part held on the rotor carrier for guiding a magnetic flux of the electric machine, said active rotor part and said rotor carrier being linked to each other by a positive fit or non-positive fit.

3. The drive device of claim 1, wherein the rotor element and the transmission device are disposed, at least partly, coaxially to one another.

4. The drive device of claim 1, wherein the transmission device comprises a differential gear.

5. The drive device of claim 4, wherein the transmission device comprises at least one transmission stage configured to be driven by the electric machine, said differential gear configured to be driven via the transmission stage and the rotor element by the electric machine.

6. The drive device of claim 1, wherein the transmission transmission stages are disposed entirely in the installation area.

7. The drive device of claim 4, wherein the transmission stages are connected in series with one another to thereby define a first transmission stage and a last transmission stage, said differential gear being configured to be driven via the last transmission stage.

8. The drive device of claim 4, wherein the transmission stages comprise a first transmission stage configured as a planetary gear, and a second transmission stages configured as a second planetary gear which is being driven by the first planetary gear and via which the differential gear is being driven.

9. The drive device of claim 8, wherein the rotor carrier is linked to a sun wheel of the first planetary gear, said first planetary gear having a first planetary carrier which is linked to a sun wheel of the second planetary gear, said second planetary gear having a second planetary carrier which is linked to the differential gear.

* * * * *

UNITED STATES PATENT AND TRADEMARK OFFICE
CERTIFICATE OF CORRECTION

Page 1 of 1

PATENT NO.        : 8,968,138 B2
APPLICATION NO.   : 13/862976
DATED             : March 3, 2015
INVENTOR(S)       : Klaus Kalmbach, Klaus Schleicher and Janina Steinz It is certified that error appears in the above-identified patent and that said Letters Patent is hereby corrected as shown below:

In the Claims

Correct claim 6, line 19 to read:

--The drive device of claim 1, wherein the transmission stages are disposed entirely in the installation area.--

Signed and Sealed this
Eleventh Day of August, 2015

Michelle K. Lee
*Director of the United States Patent and Trademark Office*